United States Patent [19]
Hong

[11] Patent Number: 5,983,988
[45] Date of Patent: Nov. 16, 1999

[54] WARMER AND A REFRIGERATOR DESIGNED FOR USE ON AN AUTOMOBILE

[76] Inventor: Wen-Hu Hong, 2nd Floor, No. 98 Ming Shen E. Road, Sec. 5, Taipei, Taipei, Taiwan

[21] Appl. No.: 08/886,015

[22] Filed: Jun. 30, 1997

[51] Int. Cl.⁶ ..................................................... B60H 3/00
[52] U.S. Cl. ................................. 165/43; 165/42; 165/58; 165/169; 165/46; 222/146.1; 126/19.5
[58] Field of Search ................................ 165/42, 43, 58, 165/169, 46; 222/146.1; 126/19.5

[56] References Cited

U.S. PATENT DOCUMENTS

| | | | |
|---|---|---|---|
| 441,628 | 11/1890 | Coon et al. ............................ | 165/58 |
| 2,277,962 | 3/1942 | Diederich .............................. | 165/43 |
| 2,309,513 | 1/1943 | Kramer .................................. | 165/42 |
| 2,533,881 | 12/1950 | Duff ...................................... | 126/19.5 |
| 2,787,128 | 4/1957 | Brown ................................... | 165/42 |
| 2,859,945 | 11/1958 | Kleist .................................... | 165/42 |
| 2,975,797 | 3/1961 | Matheney ............................. | 165/42 |
| 3,255,597 | 6/1966 | Carter, Jr. ............................. | 165/42 |
| 3,276,634 | 10/1966 | Arnot .................................... | 165/42 |
| 3,827,478 | 8/1974 | Beaudet ................................ | 165/42 |
| 3,874,361 | 4/1975 | Parrinello ............................. | 126/19.5 |
| 4,140,150 | 2/1979 | Rundell ................................ | 165/43 |
| 4,162,670 | 7/1979 | Hays .................................... | 126/19.5 |
| 4,553,584 | 11/1985 | Bloomquist ......................... | 165/42 |
| 4,846,257 | 7/1989 | Wallace et al. ..................... | 165/58 |
| 5,419,270 | 5/1995 | Berge .................................. | 165/42 |

FOREIGN PATENT DOCUMENTS

93247685  8/1994  Taiwan .

*Primary Examiner*—Ira S. Lazarus
*Assistant Examiner*—Terrell McKinnon
*Attorney, Agent, or Firm*—Dougherty & Troxell

[57] ABSTRACT

Disclosed is a warmer and a refrigerator designed for use on an automobile. The warmer and the refrigerator are two detachably connected boxes respectively defining a hot chamber and a cold chamber. The hot and the cold chambers both have an inner container and a double-pipe spiral passage wound about an outer wall of the inner container to increase heat absorbing and dissipating areas of the hot and the cold chambers. The double-pipe spiral passages of the hot and the cold chambers are led to a radiator or a heater and an air conditioning compressor, respectively, of the automobile. Two covers are pivotally connected to tops of the hot and the cold chambers, such that the covers can be lifted and opened relative to the chambers by 180 degrees. A gooseneck shank and an air-pressure type water pump can be provided to the hot and the cold chambers, so that drinking water can be directly stored in the chambers and be pumped up for drinking.

7 Claims, 8 Drawing Sheets

FIG. 9

WARMER AND A REFRIGERATOR DESIGNED FOR USE ON AN AUTOMOBILE

BACKGROUND OF THE INVENTION

The present invention relates to a warmer and a refrigerator designed for use on an automobile which respectively utilize the heat absorbed by engine cooling water and the car air conditioner coolant to respectively maintain suitable high and low temperatures therein.

Patent ZL93247685.6 titled "Warmer and Refrigerator for Use on Automobiles" granted to the inventor discloses a warmer which has a hot chamber using hot water from a radiator of an automobile to keep an interior of the hot chamber at a suitable high temperature and a refrigerator which has a cold chamber being wound by extended coolant pipe of the automobile to keep an interior of the cold chamber at a suitable low temperature. Whereby, food, drink, towels, etc. can be stored in the warmer or the refrigerator on the automobile for use by a driver and passengers on the automobile at any time.

Following drawbacks are found in the warmer and refrigerator for use on automobiles disclosed in Patent ZL93247685.6:

1. The hot chamber has a heating pipe system which utilizes and leads heat-absorbed cooling water from the automobile's radiator into the warmer via a water inlet pipe and then out of the warmer via a water outlet pipe. And, the cold chamber has a cooling pipe system which is connected to the coolant pipe of an air-conditioning compressor of the automobile and includes a coolant inlet pipe and a coolant outlet pipe. The water inlet and outlet pipes and the coolant inlet and outlet pipes are wound about inner containers of the hot chamber and the cold chamber, respectively, to form two discrete single-pipe spiral passages. Thus, water flowing into and out of the heating pipe system of the hot chamber must cycle back to the cooling water pipe connected to the radiator of the automobile, and coolant flowing into and out of the cooling pipe system of the cold chamber must cycle back to the coolant pipe of the air-conditioning compressor of the automobile. Under this condition, the water outlet pipe and the coolant outlet pipe must first extend across the spiral pipe passages respectively formed from the water inlet pipe and the coolant inlet pipe before they can extend downward to go parallelly and side by side with the water inlet pipe and the coolant inlet pipe, respectively, to the cooling water pipe and the coolant pipe. This will, of course, need more material and space for the pipes while the mounting of such pipes are difficult.

2. The single-pipe spiral passages separately winding about inner container of the hot chamber and the cold chamber contact with outer walls of these inner containers at only several turns of coil areas. There are large spaces left between every two turns of these coil areas. Thus, outer walls of the inner containers of the hot and the cold chambers can have only limited absoption areas to absorb and dissipate heat, respectively. Therefore, the warmer and the refrigerator disclosed in Patent ZL93247685.6 are not efficient in terms of the utilization of energy.

3. The hot chamber and the cold chamber are two chambers formed in an integral housing. The housing must be formed by making a mold first and must be machined, fabricated, and installed with pipes after it is formed. These procedures are time consuming and require high manufacturing cost.

4. The hot and cold chambers are provided with covers that can be lifted and opened relative to the chambers by an angle from 90 to 110 degrees. Covers being lifted to this angle relative to the chambers tend to easily and unexpectedly fall down when they are touched by someone and will very possibly pinch and injure a user's fingers extending into the chambers for something in the chambers.

5. The hot and the cold chambers disclosed in Patent ZL93247685.6 can only be used to store canned drinks or towels. Drinking water can not be directly stored in the chambers for use in a convenient manner.

Therefore, it is tried by the inventor to develop an improved automobile warmer and refrigerator to eliminate the above-mentioned drawbacks existed in the conventional warmer and refrigerator for use on automobiles, whereby the automobile warmer and refrigerator is more practical in use and has increased added value and enhanced product image in the market.

SUMMARY OF THE INVENTION

A primary object of the present invention is to provide a warmer and a refrigerator designed for use on an automobile that respectively have a hot chamber and a cold chamber.

The hot and the cold chambers both have an inner container. A heating and a cooling pipe are respectively wound about outer walls of the inner containers of the hot and the cold chambers. Wherein, the heating and the cooling pipes are wound about the inner containers in such a manner that two discrete double-pipe spiral passages are separately formed around the two inner containers, so that spaces needed for the heating and the cooling pipes can be reduced while areas on the outer walls of the inner containers of the hot and the cold chambers for absorbing and dissipating heat, respectively, can be increased. Moreover, labors and time required to winding the pipes can be reduced, too.

Another object of the present invention is to provide the above automobile warmer and refrigerator wherein the double-pipe spiral passages wound about the outer walls of the inner containers of the hot and the cold chambers can be replaced by sheet heat-accumulators to increase areas for absorbing and dissipating heat.

A further object of the present invention is to provide the above automobile warmer and refrigerator wherein the hot and the cold chambers have pivotally connected covers that can be lifted and opened relative to the chambers by 180 degrees.

A still further object of the present invention is to provide the above automobile warmer and refrigerator wherein the covers of the chambers can be provided with gooseneck shanks, air-pressure caps, manually-operated air pumps and pistons, and DC12V electric motors to supply drinking water directly from the inner container of the hot or the cold chamber.

BRIEF DESCRIPTION OF THE DRAWINGS

The above and other objects of the present invention, as well as the technical means adopted by the present invention to achieve such objects can be best understood by referring to the following detailed description of the preferred embodiments and the accompanying drawings, wherein.

DETAILED DESCRIPTION OF THE PREFERRED EMBODIMENTS

Figure 1:
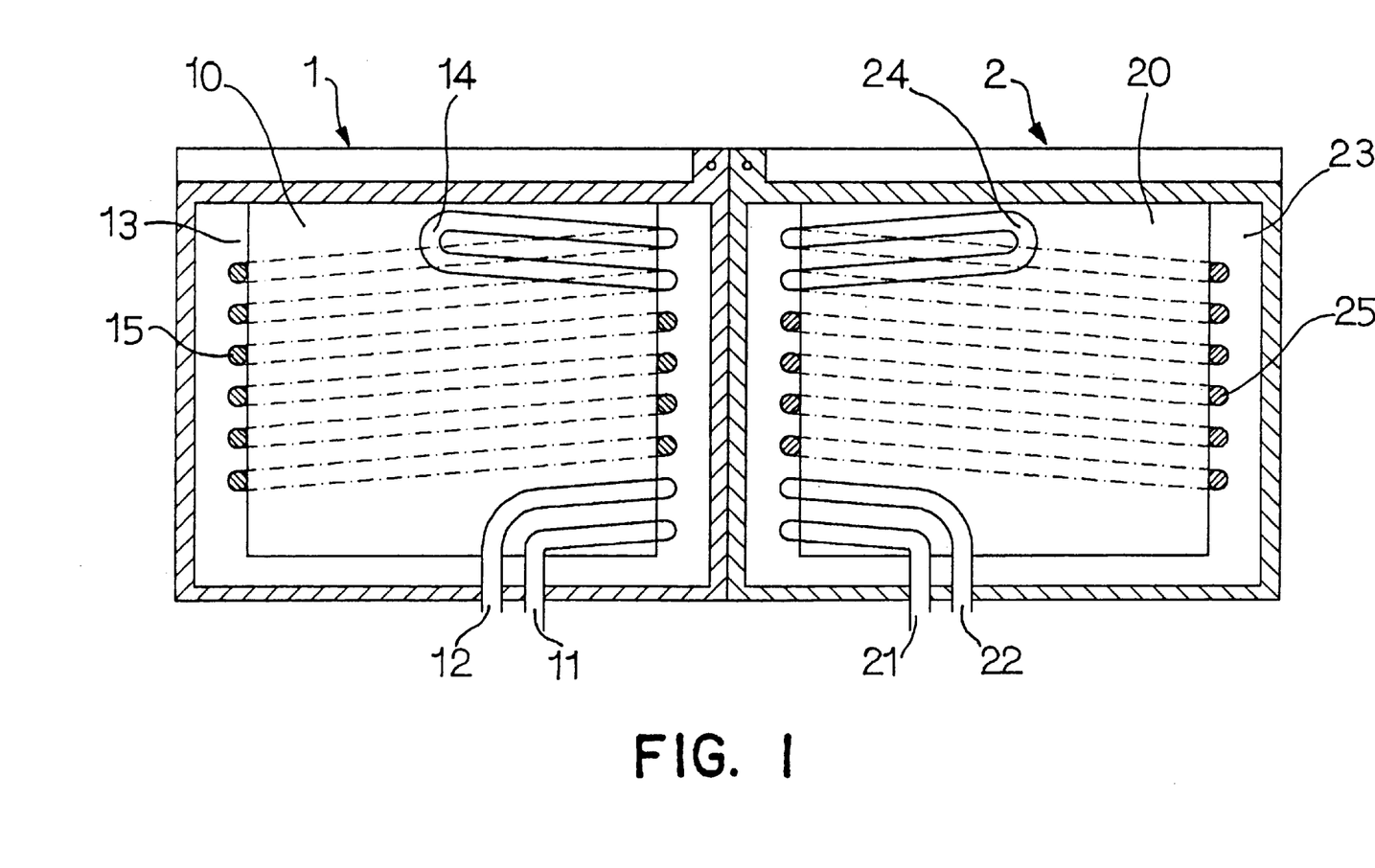
FIG. 1 illustrates the manner in which the double-pipe spiral passages are wound about the inner containers of the hot and cold chambers of the automobile warmer and refrigerator of the present invention.

Please refer to FIG. 1. The present invention relates to a warmer 1 and a refrigerator 2 particularly designed for use on an automobile. The warmer 1 includes a hot chamber 10 having a first inner container 13 provided therein and the refrigerator 2 includes a cold chamber 20 having a second inner container 23 provided therein. A heating pipeline 15 consisting of parallelly extended water inlet pipe 11 and water outlet pipe 12 is wound about an outer wall of the first inner container 13 of the hot chamber 10, such that the water inlet pipe 11 and the water outlet pipe 12 join at their one end to form a U-shaped end 14 of the heating pipeline 15 while their other ends lead to a radiator of the automobile. Similarly, a cooling pipeline 25 consisting of parallelly extended coolant inlet pipe 21 and coolant outlet pipe 22 is wound about an outer wall of the second inner container 23 of the cold chamber 20, such that the coolant inlet pipe 21 and the coolant outlet pipe 22 join at their one end to form a U-shaped end 24 of the cooling pipeline 25 while their other ends lead to an air conditioning compressor of the automobile. Heated water and coolant flowing through the heating pipeline 15 and the cooling pipeline 25, respectively, via the water inlet pipe 11 and the coolant inlet pipe 21, respectively, can flow back at the U-shaped ends 14, 24 and to the water outlet pipe 12 and the coolant outlet pipe 22, respectively. That is, the heating pipeline 15 and the cooling pipeline 25 winding about the first and the second inner containers 13, 23 are actually two discrete double-pipe sprial passages which need less space and pipe material than the single-pipe spiral passages as adopted in the conventional automobile warmer and refrigerator.

Figure 2:
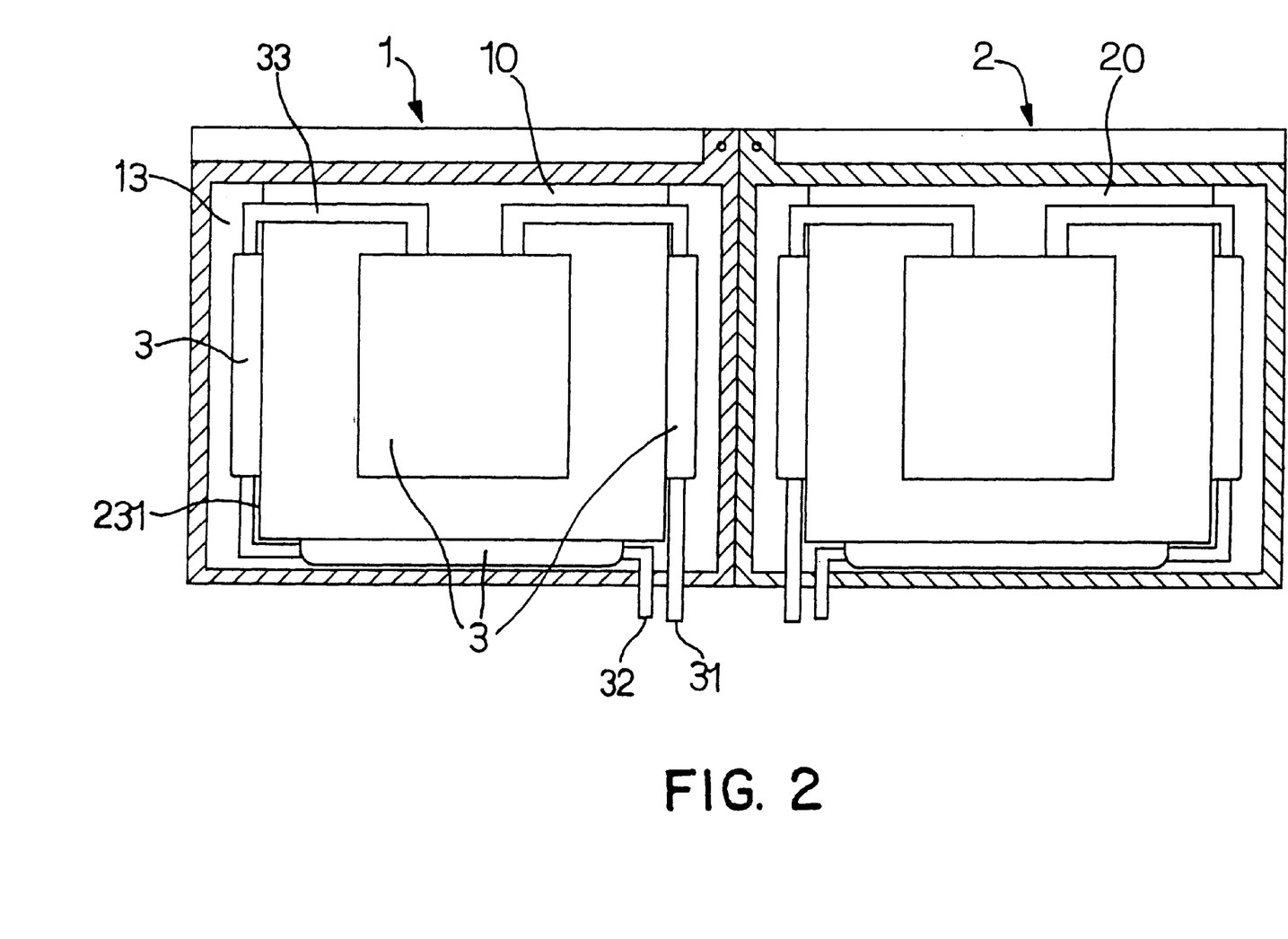
FIG. 2 illustrates the manner in which sheet heat-accumulators are attached to outer walls of the inner containers of the hot and cold chambers of the automobile warmer and refrigerator of the present invention.
Figure 3:
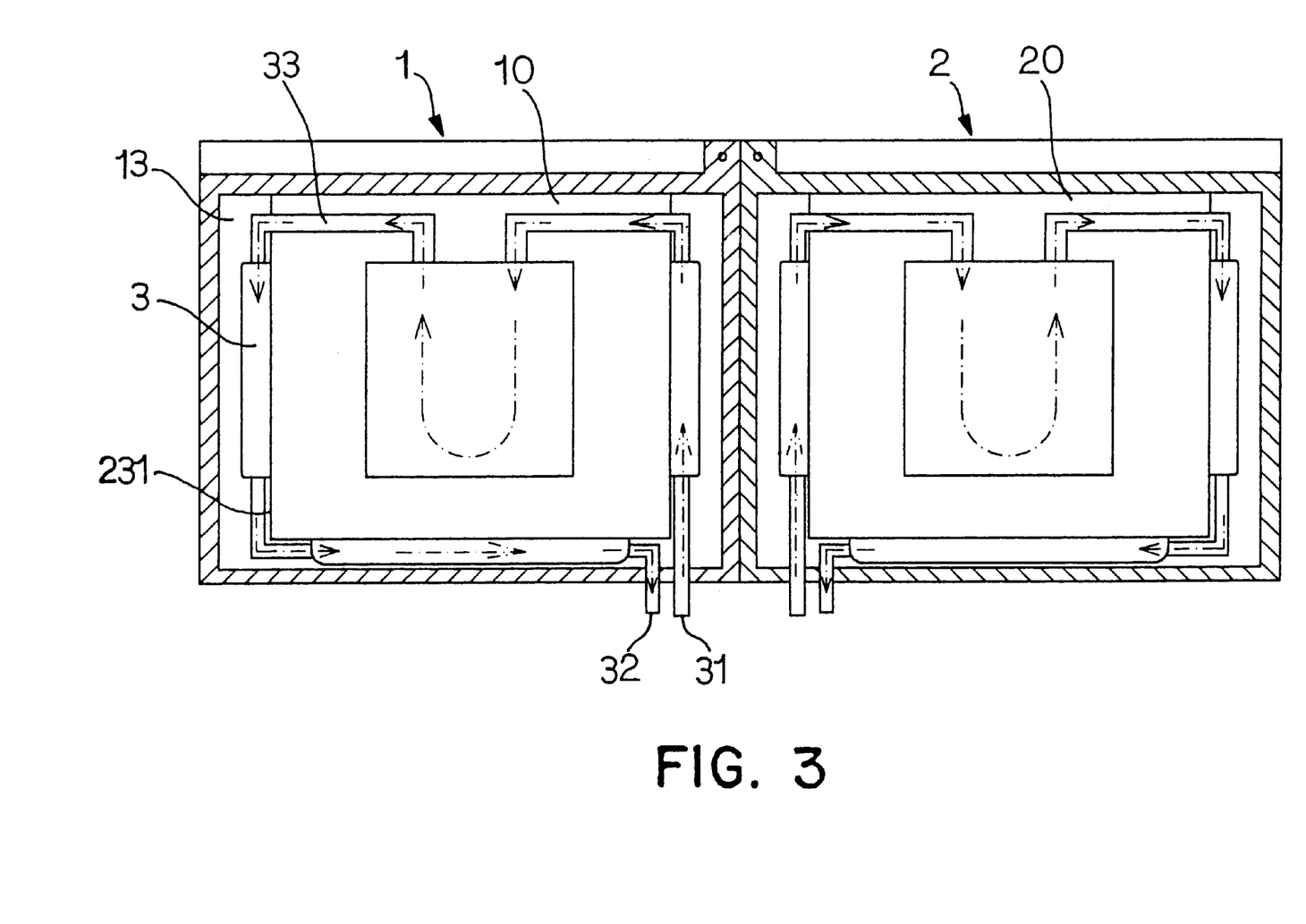
FIG. 3 illustrates the manner in which the sheet heat-accumulators of the present invention function.

FIGS. 2 and 3 illustrate another embodiment of the present invention. In this embodiment, sheet heat-accumulators 3 are used to replace the heating pipeline 15 and the cooling pipeline 25 which are wounded in the form of single-pipe or double-pipe spiral passages about the first and the second inner containers of the hot chamber 10 and the cold chamber 20, respectively, to create equivalent effect. The sheet heat-accumulators 3 are rectangular sheet members for fitly attaching to outer walls 231 (including side walls and a bottom wall) of the inner containers 13, 23. Water inlet 31 and water outlet 32 are provided on the sheet heat-accumulators. By means of connecting pipes 33, all the sheet heat-accumulators 3 attached to each inner container 13 or 23 are communicable with one another and can be filled with hot and cold water, respectively, to form a heating and a cooling loop. Since the sheet heat-accumulators 3 are attached to all sides and bottom of the outer walls 231 of the inner containers 13, 23, they create large contact areas between them and the outer walls 231 to absorb or dissipate heat. Moreover, the heat and cold can be more evenly transmitted from the sheet heat-accumulators 3 to interior of the inner containers 13, 23, resepectively. That is, the heat or cold supplied to the warmer 1 and the refrigerator 2 can be utilized in a more efficient manner.

In another embodiment of the present invention, the water inlet pipe 11 and the water outlet pipe 12 are connected to a heating pipeline of an automobile heater instead of a heat-dissipating pipe of the radiator. By this way, hot water in the heating pipeline of the automobile heater can be supplied to the warmer 1 via the water inlet pipe 11. Since a distance between the automobile heater and the warmer 1 is shorter than that between the radiator and the warmer 1, reduced pipe material and lower mounting cost is required in this embodiment.

Figure 4:
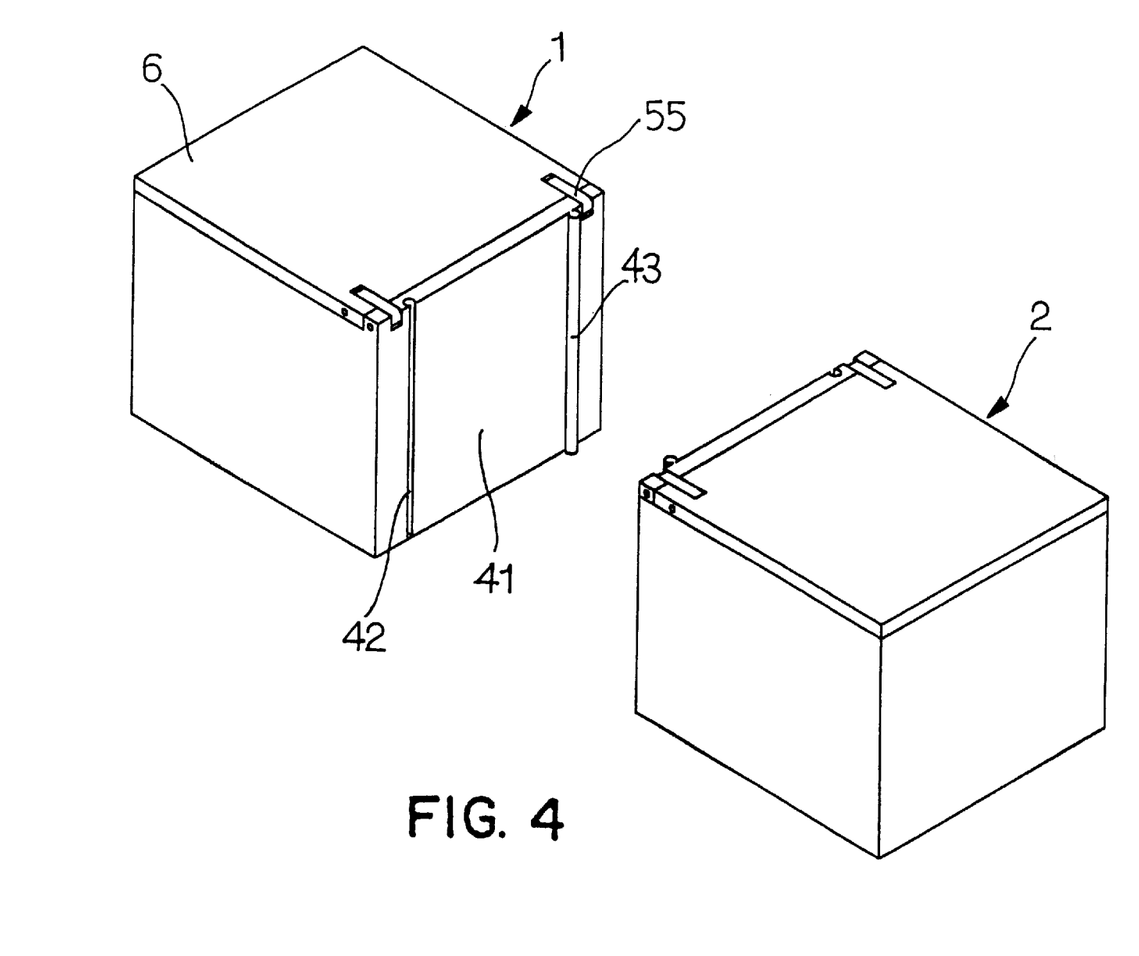
FIG. 4 illustrates the means with which the hot and the cold chambers of the automobile warmer and refrigerator of the present invention are detachably connected to each other.
Figure 5:
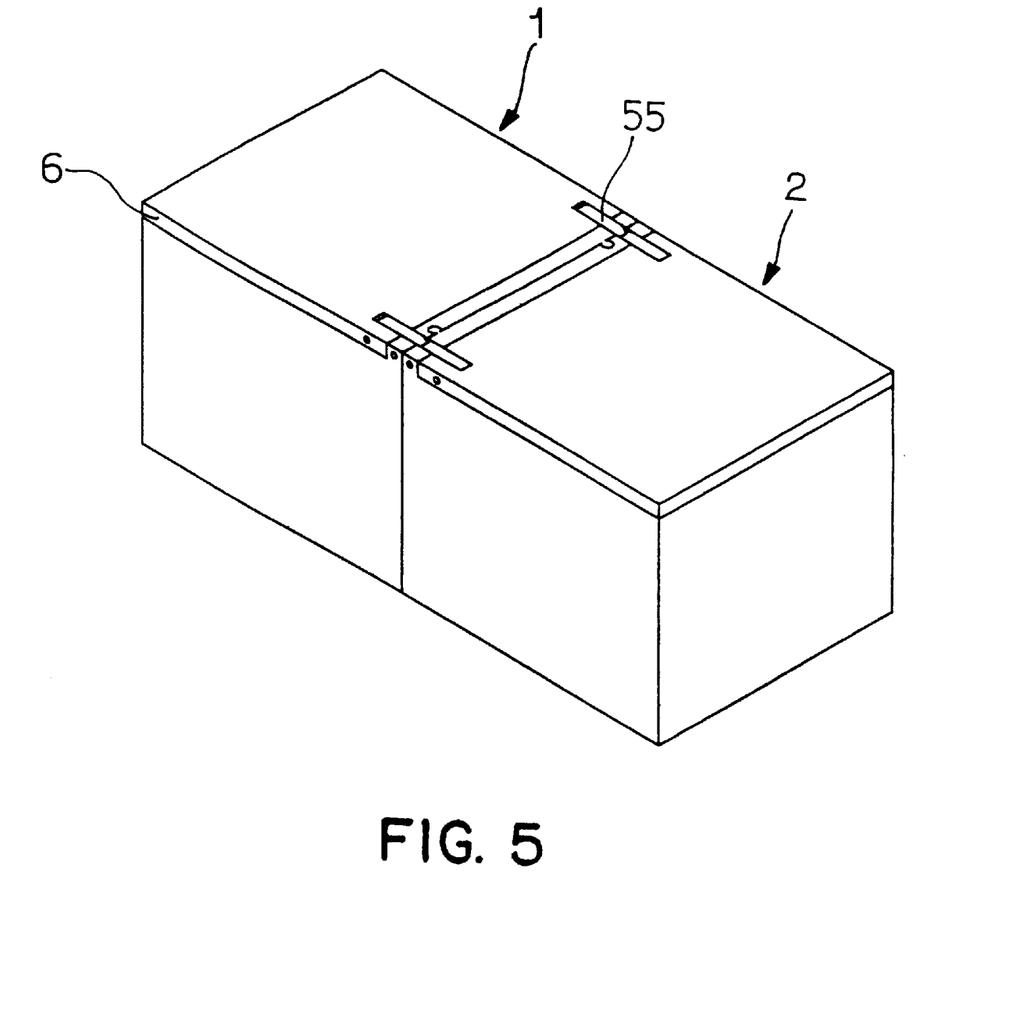
FIG. 5 illustrates the hot and the cold chambers of the automobile warmer and refrigerator of the present invention are connected to each other.

Please refer to FIGS. 4 and 5. The warmer I and the refrigerator 2 according to the present invention are two separate boxes which can be detachably connected to each other. The warmer 1 and the refrigerator 2 each has an assembling side surface 41. On the assembling side surface 41 of the warmer 1, a retaining groove 42 and an engaging rib 43 are provided to correspond to an engaging rib 43 and a retaining groove 42 formed on the assembling side surface 41 of the refrigerator 2, so that the box of the warmer 1 and the box of the refrigerator 2 can be detachably connected together by engaging the retaining grooves 42 with the engaging ribs 43. With this type of assembling, only one mold is needed to produce the boxes in mass production. The boxes can then be easily machined, fabricated, mounted with pipes, and assembled with reduced time, labor, and other manufacturing costs.

Figure 6:
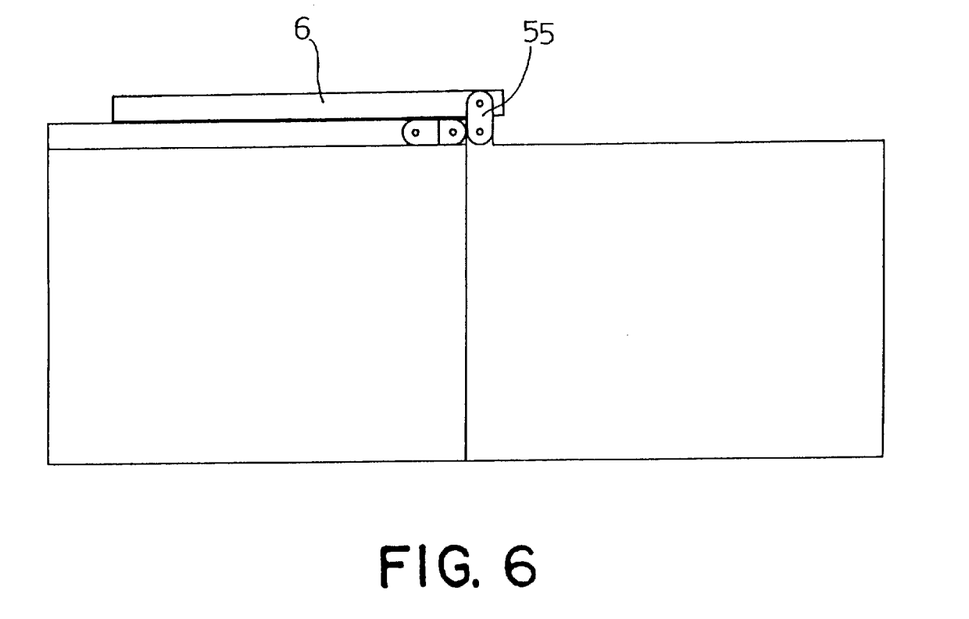
FIG. 6 is a side view showing one cover of the two chambers of the present invention being opened relative to the chamber by 180 degrees to stably lie on top of another chamber.
Figure 7:
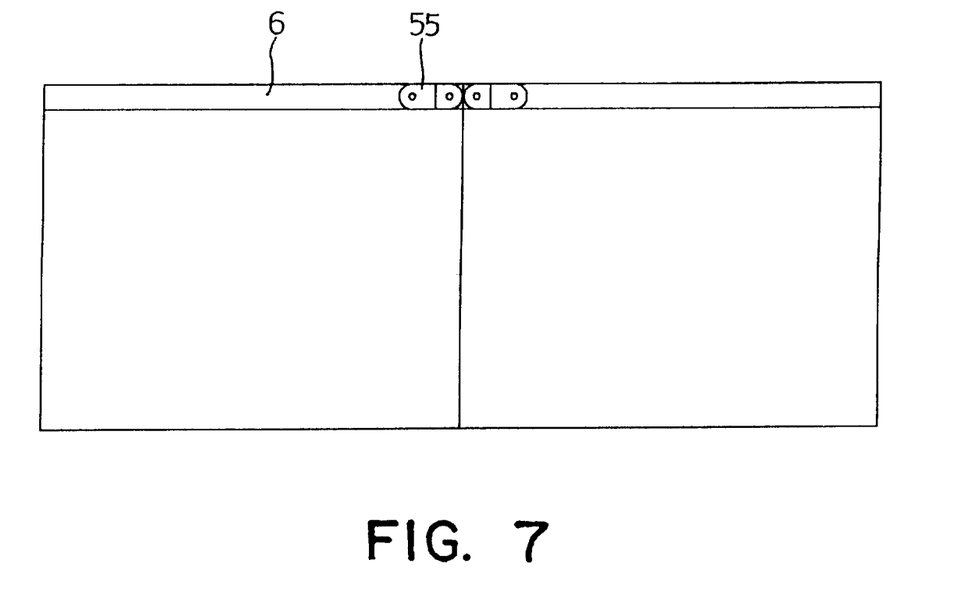
FIG. 7 is a side view showing the covers of the two chambers of the present invention being closed to top openings of the chambers.
Figure 8:
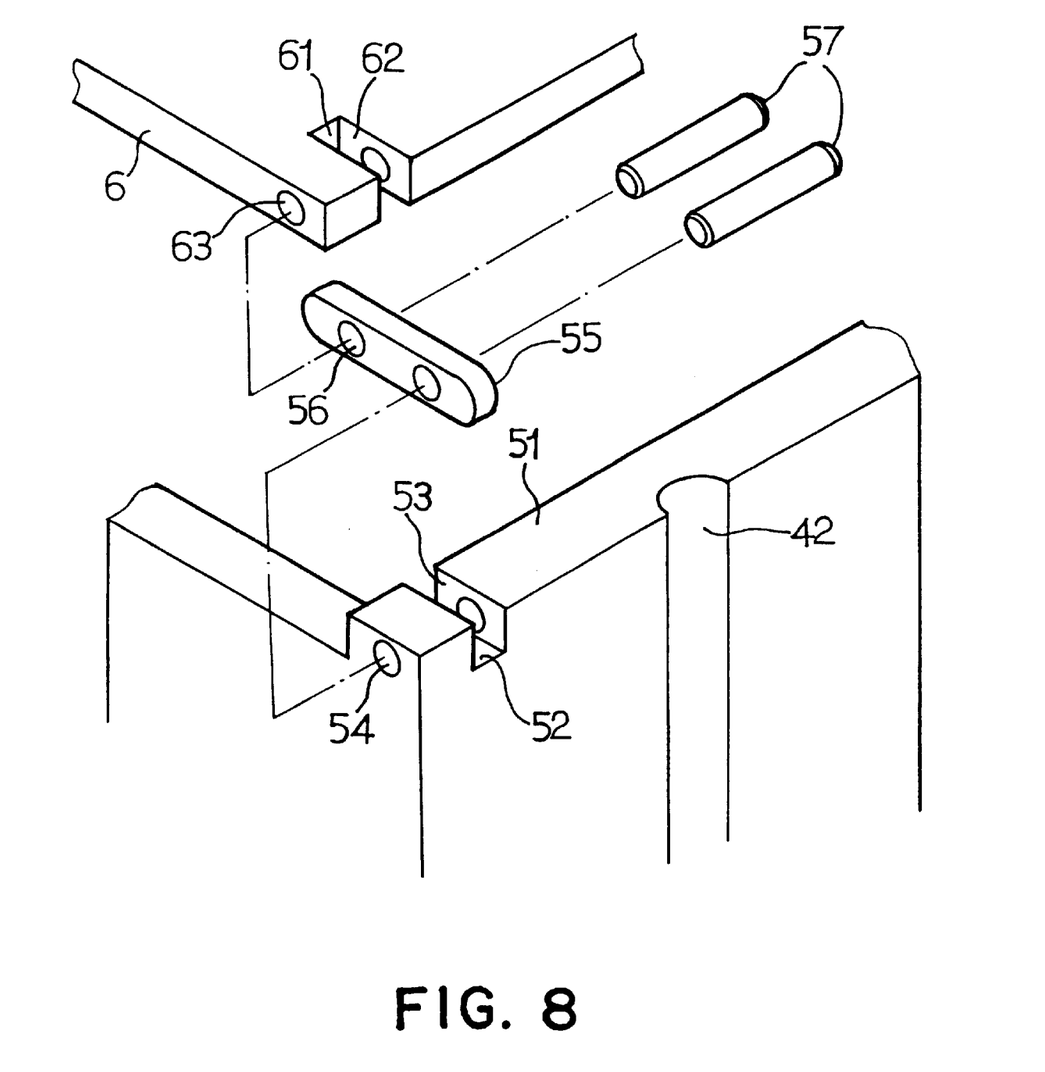
FIG. 8 is an exploded perspective showing the manner in which the cover of the hot or cold chamber is connected to the top of the chamber.

FIGS. 6, 7 and 8 illustrate the manner in which two covers 6 are pivotally connected to top openings of the warmer 1 and the refrigerator 2, so that the covers 6 can be lifted and opened by 180 degrees. Since the boxes for the warmer 1 and the refrigerator 2 have similar structure, only one box for the warmer 1 shall be described in details hereinafter. The box of the warmer 1 is provided at a top edge 51 of its side wall containing the assembling side surface 41 with first recesses 52. Two side walls 53 of each recess 52 are formed with pin eyes 54. The cover 6 of the warmer 1 is provided at an edge to be located on the top edge 51 of the warmer box with second recesses 61 corresponding to the first recesses 52. Two side walls 62 of each second recess 61 are also formed with pin holes 63. A link 55 having two round holes 56 is disposed between each first recess 52 and its corresponding second recess 61, such that two pins 57 can be separately inserted through the pin eyes 54 and the pin holes 63 of each recess, as well as the two round holes 56 on each link 55 to pivotally connect the cover 6 to the warmer box and allow the cover 6 to be lifted and opened relative to the box by 180 degrees. That is, the cover 6 of the warmer box can be opened to horizontally lie over the cover 6 of the refrigerator box, as shown in FIG. 6. Thereby, the cover 6 will not easily fall to close again due to unexpectedly touch by a user and therefore undesirably pinches and injures user's fingers extending into the box for something.

Figure 9:
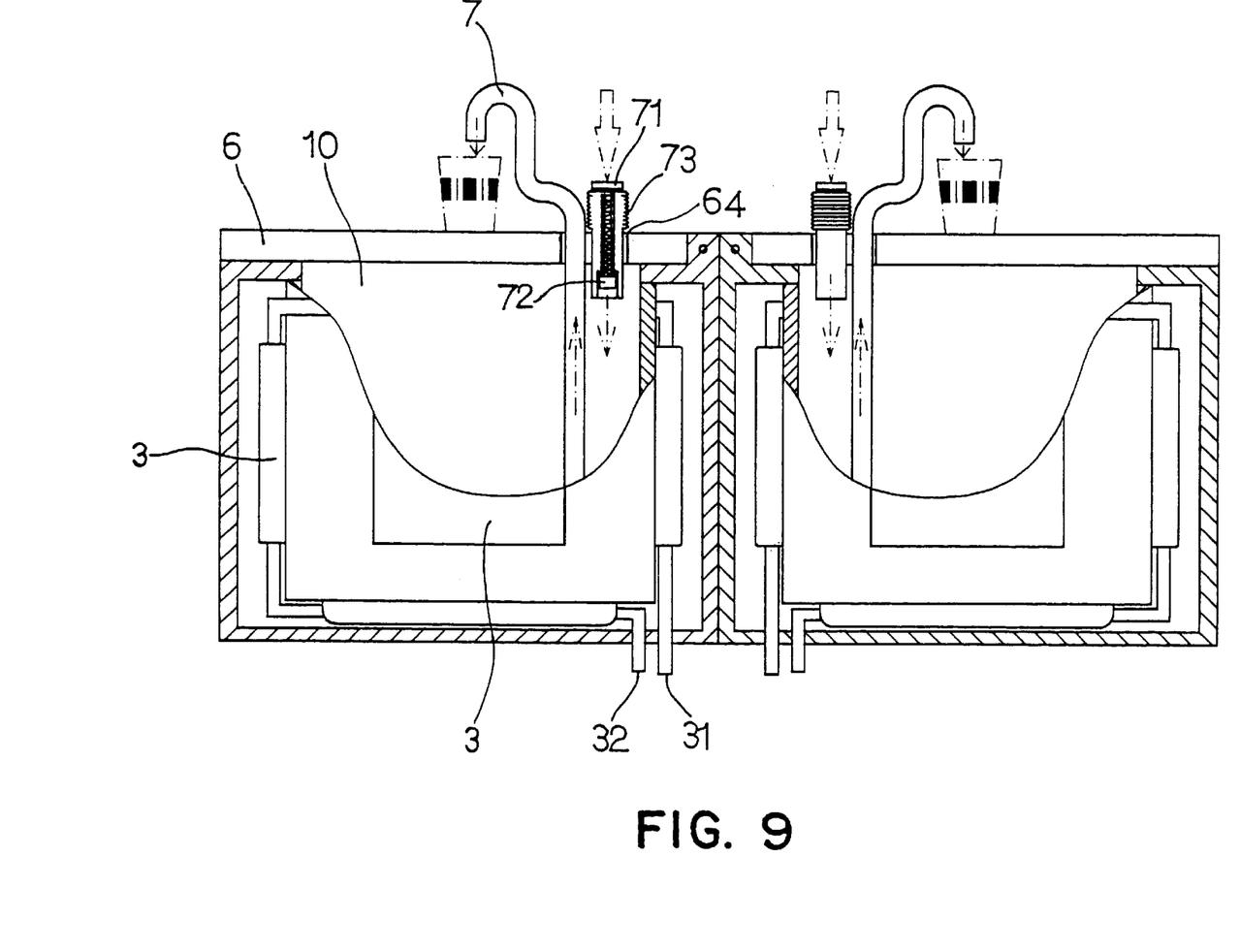
FIG. 9 illustrates the manner in which water pumping means are provided to the hot and the cold chambers of the present invention.

As shown in FIG. 9, each cover 6 of the box 1 or 2 can be provided at a suitable position with a hole 64 to accommodate a goosenech shank 7 and a water pump mechanism therein. In an embodiment of the present invention, the water pump mechanism includes an air-pressure cap 71, a piston 72, and a manually-operated air pressure pump 73. In another embodiment of the present invention, the water pump mechanism includes an air pressure pump and a DC12V electric motor. In a further embodiment of the present invention, the water pump mechanism includes blades and a motor. Whereby, when the warmer 1 or the refrigerator 2 is used to store hot or cold drinking water therein, the air-pressure cap 71 can be manually depressed to move the piston 72 of the air-pressure pump 73 downward and force air in the pump 73 into the hot chamber 10 or the cold chamber 220, so that hot or cold water stored in the inner container of the hot or the cold chamber 10 or 20 is forced to enter the gooseneck shank 7 and flows out of the warmer 1 or the refrigerator 2 for drinking.

What is to be noted is the form of the present invention shown and disclosed is to be taken as a preferred embodiment of the invention and that various changes in the shape, size, and arrangements of parts, may be resorted to without departing from the spirit of the invention or the scope of the subjoined claims.

What is claimed is:

1. A warmer and a refrigerator designed for use on an automobile comprising a hot chamber and a cold chamber said hot chamber having a first inner container provided therein and a heating system provided around said first inner container; said cold chamber having a second inner container provided therein and a cooling system provided about said second inner container and wherein said heating system provided around said first inner container of said hot chamber is a heating pipeline consisting of parallel extended water inlet pipe and water outlet pipe to wind about an outer wall of said first inner container, forming a double-pipe spiral water passage, such that said water inlet pipe and said water outlet pipe join at their end to form a U-shaped end of said heating pipeline while other ends of said water inlet pipe and said water outlet pipe lead to a radiator of the automobile; and said cooling system provided around said second inner container of said cold chamber is a cooling pipeline consisting of parallel extended coolant inlet pipe and coolant outlet pipe to wind about an outer wall of said second inner container, forming a double-pipe spiral coolant passage, such that said coolant inlet pipe and said coolant outlet pipe join at their one end to form a U-shaped end of said cooling pipeline while other ends of said coolant inlet pipe and said coolant outlet pipe lead to an air conditioning compressor of the automobile and wherein said warmer and said refrigerator are two separate boxes each having an assembling side surface, a retaining groove and engaging rib provided on said assembling side surface of each of said warmer and said refrigerator and wherein said retaining groove and said engaging rib on said warmer corresponds to said engaging rib and said retaining groove on said refrigerator, so that, said box of said warmer and said box of said refrigerator can be detachably connected together by engaging said retaining grooves with said engaging ribs.

2. A warmer and a refrigerator designed for use on an automobile as claimed in claim 1, wherein said heating system provided around said first inner container of said hot chamber is a heating pipeline consisting of parallelly extended water inlet pipe and water outlet pipe to wind about an outer wall of said first inner container, forming a double-pipe spiral water passage, such that said water inlet pipe and said water outlet pipe join at their one end to form a U-shaped end of said heating pipeline while other ends of said water inlet pipe and said water outlet pipe lead to a heating pipe of a heater of the automobile; and said cooling system provided around said second inner container of said cold chamber is a cooling pipeline consisting of parallelly extended coolant inlet pipe and coolant outlet pipe to wind about an outer wall of said second inner container, forming a double-pipe spiral coolant passage, such that said coolant inlet pipe and said coolant outlet pipe join at their one end to form a U-shaped end of said cooling pipeline while other ends of said coolant inlet pipe and said coolant outlet pipe lead to an air conditioning compressor of the automobile.

3. A warmer and a refrigerator designed for use on an automobile as claimed in claim 1, wherein said heating and said cooling systems respectively provided around said first and said second inner container of said hot and said cold chambers include rectangular sheet heat-accumulators separately attached to outer side walls and a bottom wall of said first and said second inner containers of said hot and said cold chambers, respectively; said heating and said cooling sytems being respectively provided with a water inlet and a water outlet; and every two adjacent sheet heat-accumulators being connected by connecting pipes, so that said sheet heat-accumulators are communicable with one another.

4. A warmer and a refrigerator designed for use on an automobile as claimed in claim 1, wherein both boxes of said warmer and said refrigerator are provided at a top edge of one side wall containing said assembling side surface with first recesses each having pin eyes formed at two side walls of said first recesses; and wherein both said warmer and said refrigerator have a cover, said cover each being provided at an edge to be located on said top edge of each said box with second recesses corresponding to said first recesses and having pin holes formed at two side walls of said second recesses; whereby links each having two round holes can be separately disposed between every said first recesses and their corresponding second recesses, so that two pins can be separately inserted through said pin eyes and said pin holes respectively formed on each said first and each said second recess, as well as through said round holes formed on each said link, to pivotally connect each said cover to each said box and to allow each said cover to be lifted and opened relative to each said box by 180 degrees.

5. A warmer and a refrigerator designed for use on an automobile as claimed in claim 4, wherein each said cover is provided at a suitable position with a hole to accommodate a gooseneck shank and a pump mechanism, said pump mechanism including an air-pressure cap, a piston, and a manually-operated air pressure pump.

6. A warmer and a refrigerator designed for use on an automobile as claimed in claim 4, wherein each said cover is provided at a suitable position with a hole to accommodate a gooseneck shank and a pump mechanism, said pump mechanism including an air pressure pump and a motor.

7. A warmer and a refrigerator designed for use on an automobile as claimed in claim 4, wherein each said cover is provided at a suitable position with a hole to accommodate a gooseneck shank and a pump mechanism, said pump mechanism including blades and a motor.

* * * * *